(12) United States Patent
Santos et al.

(10) Patent No.: US 6,700,367 B1
(45) Date of Patent: Mar. 2, 2004

(54) BEARING EQUIPPED WITH MAGNETIC ENCODER AND SENSOR INCLUDING ALIGNED SENSING ELEMENTS

(75) Inventors: A. John Santos, Farmington, CT (US); Mark E. LaCroix, New Hartford, CT (US); Pascal Desbiolles, Biauvy (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/549,634

(22) Filed: Apr. 14, 2000

(30) Foreign Application Priority Data

Apr. 14, 1999 (FR) .............................. 99 04658

(51) Int. Cl.[7] .......................... G01P 3/44; G01P 3/487; G01P 13/00; G01B 7/30
(52) U.S. Cl. .................................. 324/165; 324/207.25
(58) Field of Search .................... 324/207.25, 207.2, 324/207.21, 165, 174, 233, 173; 384/448; 340/672

(56) References Cited

U.S. PATENT DOCUMENTS

| 4,418,372 A | 11/1983 | Hayashida et al. ......... 360/113 |
| 4,946,295 A | 8/1990 | Hajzler ........................ 384/448 |
| 4,968,156 A | 11/1990 | Hajzler ........................ 384/448 |
| 5,017,868 A | 5/1991 | Hajzler .................... 324/207.22 |
| 5,026,178 A | * | 6/1991 | Ballhaus .................... 384/448 |
| 5,191,284 A | * | 3/1993 | Moretti et al. .............. 324/174 |
| 5,310,266 A | 5/1994 | Coux et al. .................. 384/448 |
| 5,431,413 A | 7/1995 | Hajzler ........................... 277/2 |
| 5,451,869 A | 9/1995 | Alff ............................. 324/173 |
| 5,523,681 A | 6/1996 | Hajzler et al. ............... 324/174 |
| 5,570,013 A | 10/1996 | Polinsky et al. ............. 324/174 |
| 5,594,334 A | 1/1997 | Sonnerat et al. ............. 324/173 |
| 5,611,545 A | 3/1997 | Nicot ............................. 277/2 |
| 5,640,087 A | 6/1997 | Alff ............................. 324/173 |
| 5,803,419 A | 9/1998 | Nicot ........................ 248/224.7 |
| 6,294,910 B1 | 9/2001 | Travostino et al. ....... 324/207.25 |

FOREIGN PATENT DOCUMENTS

| EP | 0274841 | 7/1988 | .......... G01D/5/248 |
| EP | 0 375 019 | 6/1990 | |
| EP | 0 395 783 | 11/1990 | |
| EP | 0395783 | 11/1990 | ............. G01P/3/44 |
| EP | 0 376 771 | 2/1992 | |
| EP | 0 420 040 | 7/1993 | |
| EP | 0 420 041 | 7/1993 | |
| EP | 0 557 931 | 9/1993 | |
| EP | 0 557 932 | 9/1993 | |
| EP | 0 522 933 | 3/1994 | |
| EP | 0 438 624 | 5/1994 | |
| EP | 0 484 195 | 8/1994 | |
| EP | 0 518 157 | 12/1994 | |
| EP | 0 498 298 | 3/1995 | |
| EP | 0 487 405 | 8/1995 | |
| EP | 0 488 853 | 8/1995 | |
| EP | 0 521 789 | 12/1995 | |
| EP | 0 745 857 | 12/1996 | |
| EP | 0 751 311 | 1/1997 | |
| EP | 0 531 924 | 3/1997 | |
| EP | 0 767 385 | 4/1997 | |
| EP | 0 647 851 | 7/1998 | |
| EP | 0890752 | 1/1999 | ........... F16C/19/52 |
| EP | 0 701 133 | 6/1999 | |
| EP | 0 701 132 | 11/1999 | |
| EP | 0 753 679 | 3/2000 | |
| EP | 0 693 689 | 10/2001 | |
| EP | 0 714 029 | 12/2001 | |
| FR | 2563668 | 10/1985 | ............. H03K/5/19 |

* cited by examiner

Primary Examiner—Walter E. Snow
(74) Attorney, Agent, or Firm—Michael Best & Friedrich LLP

(57) ABSTRACT

A bearing provided with an annular means generating magnetic pulses and with a device for detecting these pulses, wherein the detection device comprises a plurality of aligned sensitive elements. The sensitive elements are placed equidistantly from one another and the detection device comprises an even number 2N of sensitive elements.

20 Claims, 4 Drawing Sheets

$$SIN = (S1 - S2) - (S1' - S2')$$
$$COS = (S1 + S2) - (S1' + S2')$$

BEARING EQUIPPED WITH MAGNETIC ENCODER AND SENSOR INCLUDING ALIGNED SENSING ELEMENTS

The invention relates to the technical domain of bearings provided with a rotating means generating pulses, and referred to as an "encoder", a detection device, referred to as a "sensor", make it possible to obtain information, such as for example, the speed of rotation, the angular position and the direction of rotation of a bush comprising such a bearing with built-in encoder.

Such bushes may, for example, be employed for the wheels of motor vehicles provided with a wheel anti-lock system.

The invention relates more particularly, but not exclusively, to bearings with built-in magnetic encoder, the functionally associated sensor being of magnetoresistor or Hall-effect probe type.

The expression "Hall-effect probe" here designates sensors comprising at least one sensitive element, generally a semiconductor in wafer form, such that, when a current I flows through it, whilst being subjected moreover to an induction B making an angle θ with the current, a voltage V equal to V=K.I.B. sinθ appears in a direction perpendicular to the current I and to the induction B, K being referred to as the "Hall constant", and being characteristic of the material and of the geometry of the sensitive element, K varying with temperature.

The expression "magnetoresistor" here designates a varistor sensitive to the intensity of a magnetic field, or in other words a resistor made of a semiconductor material whose ohmic value varies alongside a variation in the intensity of a unidirectional magnetic field applied perpendicularly to the direction of the current flowing through the resistor.

Hall probes are regarded as active sensors, insofar as the information delivered is related to the electromotive force.

When these Hall probes are used for conveying position or displacement, the magnet which creates the induction is the test body on which the primary value to be measured acts, modifying the secondary measureand, namely conventionally the normal component of the induction, to which measurand the probe is directly sensitive.

Numerous designs of bearings with built-in magnetic encoder and sensors of Hall-effect probe or magnetoresistor type are already known in the prior art.

Reference may be made for example to the following documents:

French patent applications 2 667 947, 2 669 432, 2 669 728, 2 671 633, 2 678 691, 2 678 692, 2 690 989, 2 693 272, 2 694 082, 2 702 567, 2 710 985, 2 718 499;

European patent applications 375 019, 420 040, 420 041, 438 624, 487 405, 488 853, 498 298, 518 157, 521 789, 522 933, 531 924, 557 931, 557 932, 647 851, 693 689, 701 132, 701 133, 714 029, 745 857, 751 311, 753 679, 767 385.

Reference may be made, likewise by way of example, to the following documents emanating from the applicant:

French patent applications 2 639 689, 2 640 706, 2 645 924, 2 730 283, 2 732 458, 2 717 266, 2 701 298;

European patent applications 371 836, 376 771, 484 195, 394 083, 607 719, 616 219, 619 438, 631 140, 652 438, 671 628, 725 281, 735 348.

When one wishes to ascertain both the speed of rotation of the inner race or of the outer race of the bearing and also the direction of rotation of this race, it is known practice to utilize two signals electrically out of phase by 90° to define the direction of rotation.

For the sake of clarity, it is recalled here that two sinusoidal signals of like frequency are said to be in quadrature when the signals are out of phase by π/2 or 90°, i.e. a quarter of a cycle, that is to say when one of the signals is at its peak value while the other is passing through zero.

Thus, for example, the document FR-A-2 599 794, emanating from the applicant, describes a bush or bearing with information sensor comprising a fixed element supporting, in one embodiment, two Hall sensors or magnetoresistors angularly offset by an interval of n+0.5n, in which n is the length of a magnet.

The document EP-A-395 783 describes a bush with a sensor for measuring the speed of rotation and/or the angle of rotation, comprising one or more Hall-effect sensors.

In the devices of the type mentioned above, the out-of-phase signals emanate from two Hall-effect sensitive elements or magnetoresistors, placed on a substrate or implanted directly on silicon with a defined and fixed distance between them, this distance being dependent on the encoder.

Given the inter-element distance fixed by the very principle of the sensor, in the case where the polar distance is not suitable, the digital signals emanating from the sensitive elements are not in quadrature.

Hence, the devices known from the prior art have the following drawbacks:

the polar length span, and therefore the encoder span which can be used with a dual sensor (that is to say having two sensitive elements), whose polar length is fixed, is limited by the tolerance in the quadrature of the digital output signals;

for a polar length corresponding to the inter-element distance, the tolerance in the output signals is dependent on the technology of the sensor and on the accuracy of placement of the sensitive elements;

in the case of a dual sensor delivering analog signals associated with an interpolation principle such as described in the document WO-97/01660 or in the document FR-97/12033, the accuracy required with regard to the quadrature of the analog signals limits the use of such a sensor to magnetic encoders whose polar distance corresponds accurately to the inter-element distance.

The invention relates to a device for detecting the direction of rotation of an outer race or of an inner race of a bearing, this device also allowing the detection of the angular position and of the speed of rotation of the said race, the said device allowing adaptation to various polar lengths and cancellation of the magnetic offset.

For this purpose, the subject of the invention is a bearing provided with an annular means generating magnetic pulses and with a device for detecting these pulses, the detection device comprising a plurality of aligned sensitive elements.

The aligned sensitive elements are, for example, chosen from among the group comprising Hall-effect probes, magnetoresistors, giant magnetoresistors and are placed equidistantly from one another.

According to one embodiment, the pulse generating means is an annular member 15 which is made of a synthetic material laden with ferrite particles and is formed by a plurality of contiguous domains 18 having reversed direction of magnetization of a given domain with respect to the two domains which are contiguous with it, as shown in FIG. 4.

In a first embodiment, the detection device comprises an even number 2N of sensitive elements, for example divided into two subassemblies of N elements, each sensitive element of the first subassembly being connected to a first adder, each sensitive element of the second subassembly being connected to a second adder, the two sums $S_1$, $S_2$ emanating from the first and second adders being connected to the input of a third adder, the output $S_1$ of the first adder and, via an inverter, the output $S_1$ of the second adder being connected to the input of a fourth adder, the signals SIN=$S_1+S_2$ and COS=$S_1-S_2$ emanating from the third and fourth adders being processed by a circuit so as to deduce the direction of rotation and/or the speed or rotation and/or the position of the pulse generating means with respect to the detection device.

In a first variant, the polar length Lp of the encoder is substantially equal to the product of the number 2N of sensitive elements times the distance d between sensitive elements, the signals SIN and COS then being in substantially perfect quadrature and of substantially like amplitude.

In a second variant, the polar length Lp of the encoder is less than the product of the number 2N of sensitive elements times the distance d between sensitive elements.

In a third variant, the polar length Lp of the encoder is greater than the product of the number 2N of sensitive elements times the distance d between sensitive elements.

By programming an even number 2M of sensitive elements, less than the total number 2N of these elements is employed to form two subassemblies of M elements, each sensitive element of the first subassembly being connected to a first adder, each sensitive element of the second subassembly being connected to a second adder, the two sums emanating from the first and second adders being connected to the input of a third adder, the output of the first adder and, via an inverter, the output of the second adder being connected to the input of a fourth adder, the signals emanating from the third and fourth adders being processed by a circuit so as to deduce the direction of rotation and/or the speed or rotation and/or the position of the pulse generating means with respect to the detection device, the said signals being in substantially perfect quadrature.

The programming can be carried out by EEPROM or by Zener Zapping.

In one envisageable subvariant, an amplifier circuit is able to re-establish an identical amplitude for the signals emanating from the third and fourth adders.

In a second embodiment, the detection device comprises a number of sensitive elements which is a multiple of four, for example divided into four subassemblies of P elements, each sensitive element of the first subassembly with P elements being connected to a first adder supplying a signal $S_1$;

each sensitive element of the second subassembly with P elements being connected to a second adder supplying a signal $S_2$;

each sensitive element of the third subassembly with P elements being connected to a third adder supplying a signal $S'_1$;

each sensitive element of the fourth subassembly with P elements being connected to a fourth adder supplying a signal $S'_2$;

a circuit of adders and of inverters supplying two signals SIN and COS respectively equal to:

$SIN=(S_1-S_2)-(S'_1-S'_2)$;

$COS=(S_1+S_2)-(S'_1+S'_2)$;

these signals SIN and COS being devoid of magnetic offset.

As a variant, the detection device comprises an interpolator increasing the resolution of these output signals.

In another embodiment, the sensitive elements are integrated on an ASIC type circuit support, the detection device is incorporated within an ASIC type customized integrated circuit.

According to one embodiment, the pulse generating means is integrated into a preassembled assembly forming a seal, the detection device being secured in a possibly removable manner to the fixed race.

Other subjects and advantages of the invention will become apparent in the course of the following description of embodiments, which description will be given with reference to the appended drawings in which.

A bearing with built-in magnetic encoder comprises a multipole rotating means generating magnetic pulses and referred to as the "encoder", and a device for detecting this magnetic field, referred to as the "sensor".

The encoder comprises an even number of poles and is disposed, either on the circumference of a rotating race, or integrated into a pre-assembled assembly forming a seal.

For example, the multipole magnetized encoder can be an annular member, made of a synthetic material laden with particles of Barium ferrite or of Strontium ferrite, or of some other hard ferromagnetic material, and is formed by a plurality of contiguous domains having reversed direction of magnetization of a given domain with respect to the two domains which are contiguous with it.

The polar length Lp of the sensor is defined as the length of a magnetic pole measured at the relevant reading radius.

In such a configuration, the magnetic induction delivered by the encoder can be regarded as sinusoidal at the relevant gap.

Figure 1:
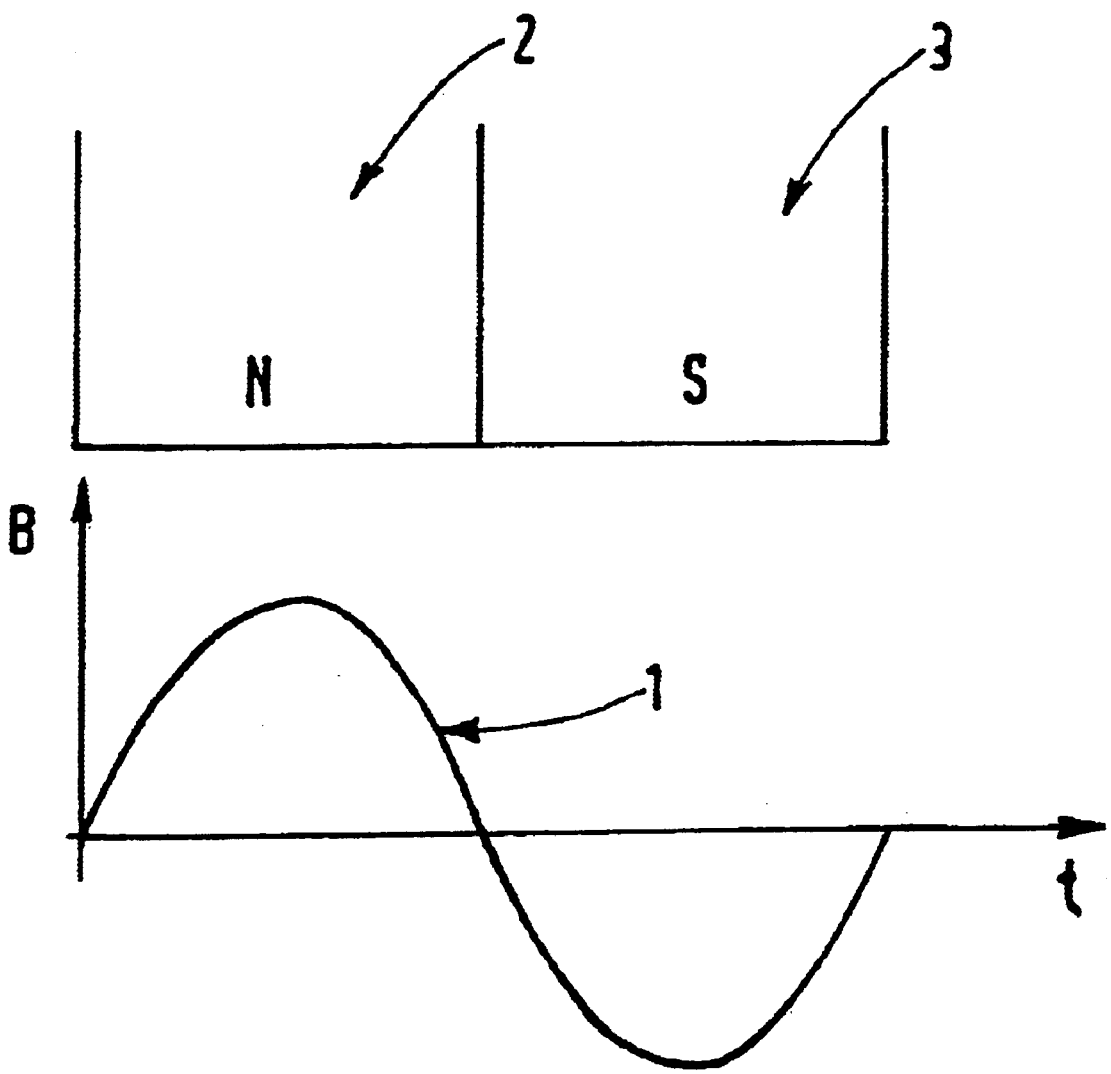
FIG. 1 is a partial schematic representation of a pair of poles of an encoder and of the substantially sinusoidal magnetic induction which it delivers at the working gap.

FIG. 1 schematically illustrates a period 1 of a component, for example normal, of the said induction B, for a pair of poles 2, 3 of the encoder.

The detection device 4 comprises an even number 2N of sensitive elements 5 of magnetoresistor or Hall-effect probe type, placed an equal distance d apart, these elements 5 being disposed substantially along a straight line D, for example the sensitive elements 5 can be disposed on an arc of a circle which can be approximated to a straight line.

Figure 2:
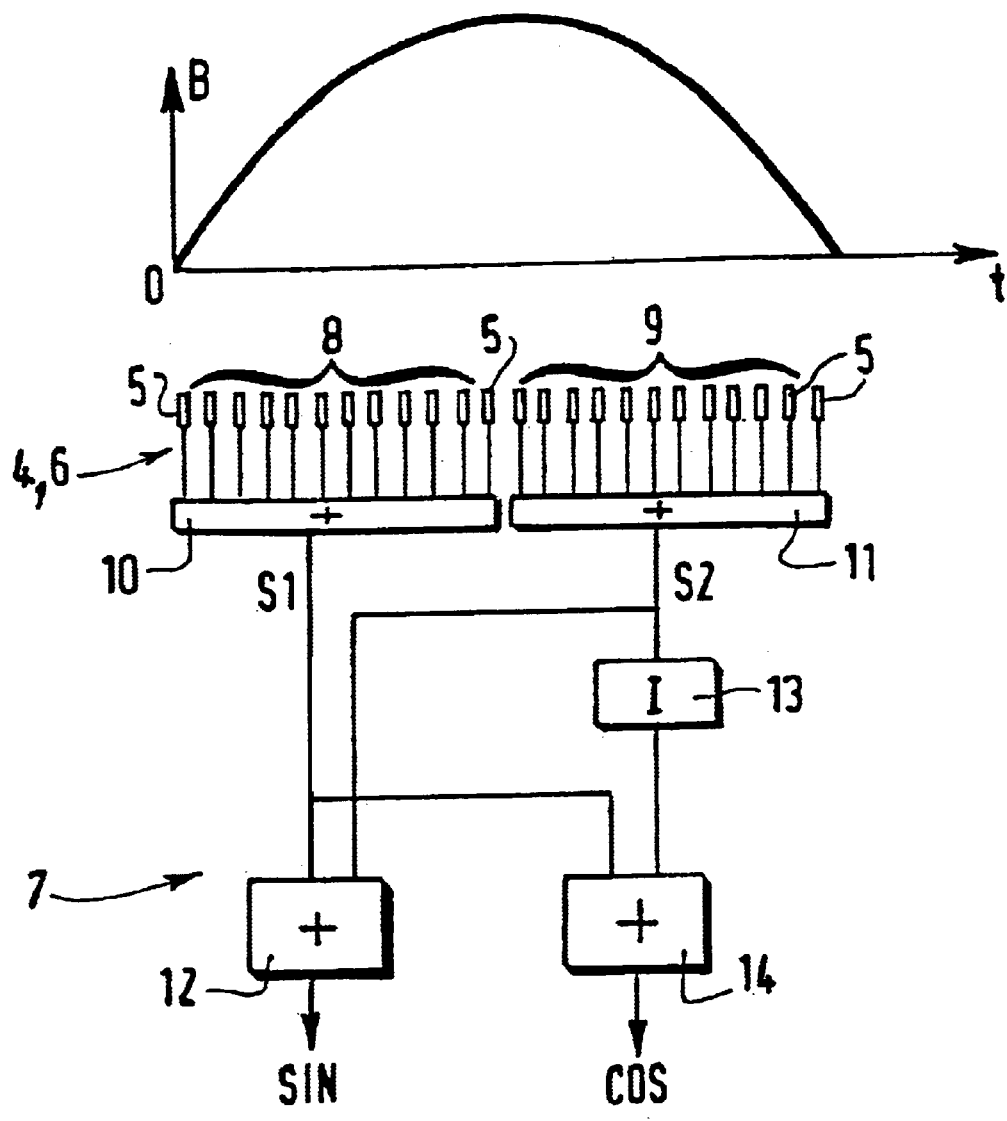
FIG. 2 represents an embodiment of the detection device according to the invention.
Figure 2:
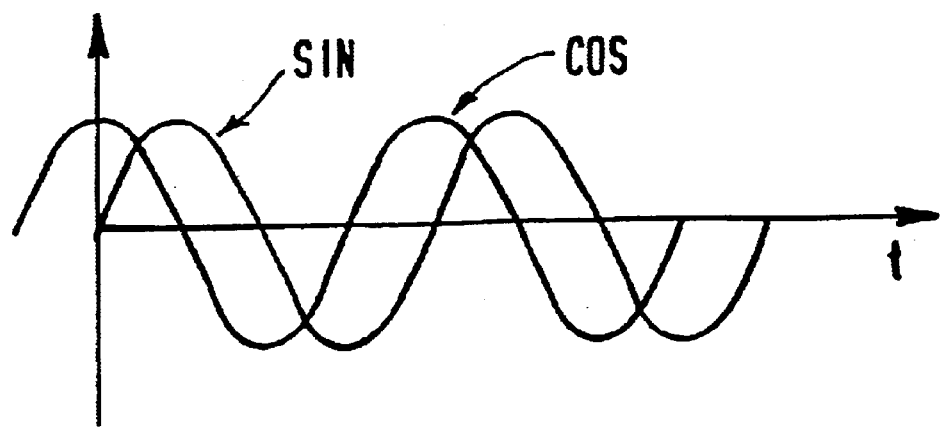
Figure 3:
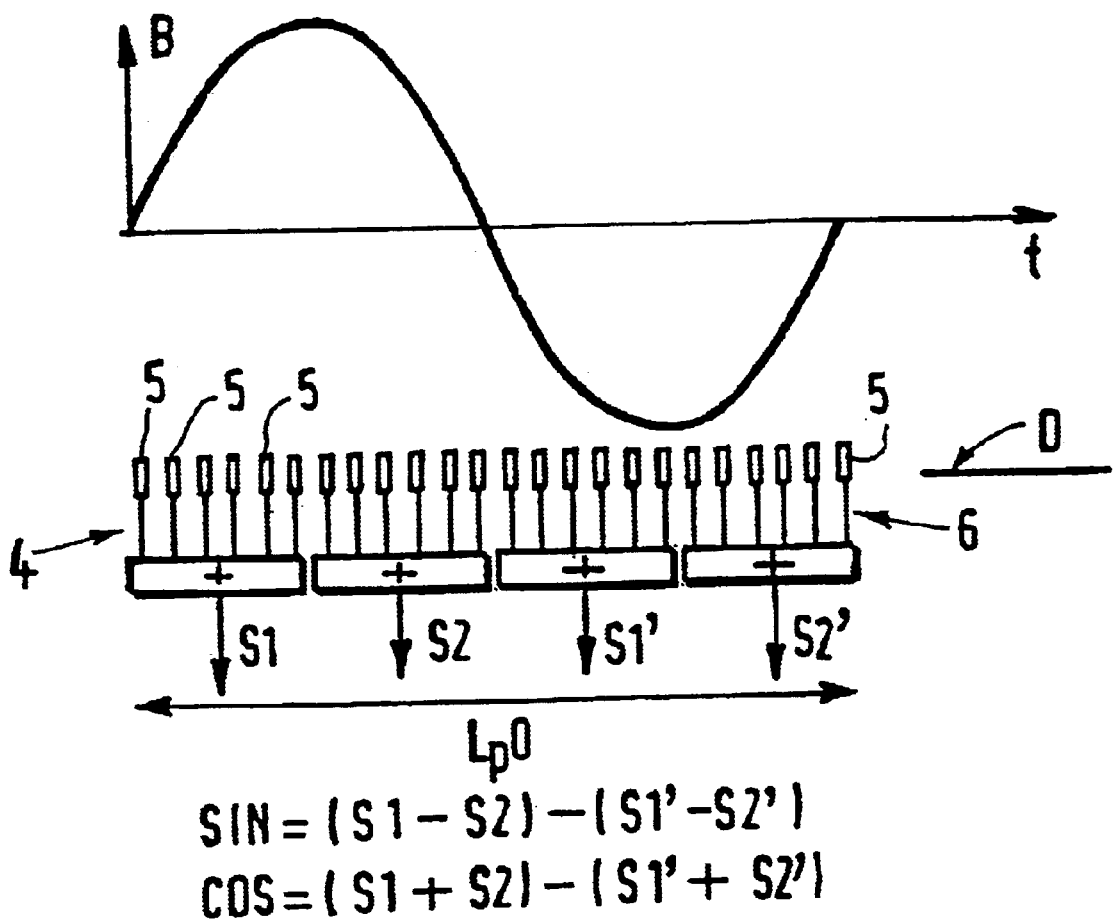
FIG. 3 represents a second embodiment of a detection device according to the invention.
Figure 3:
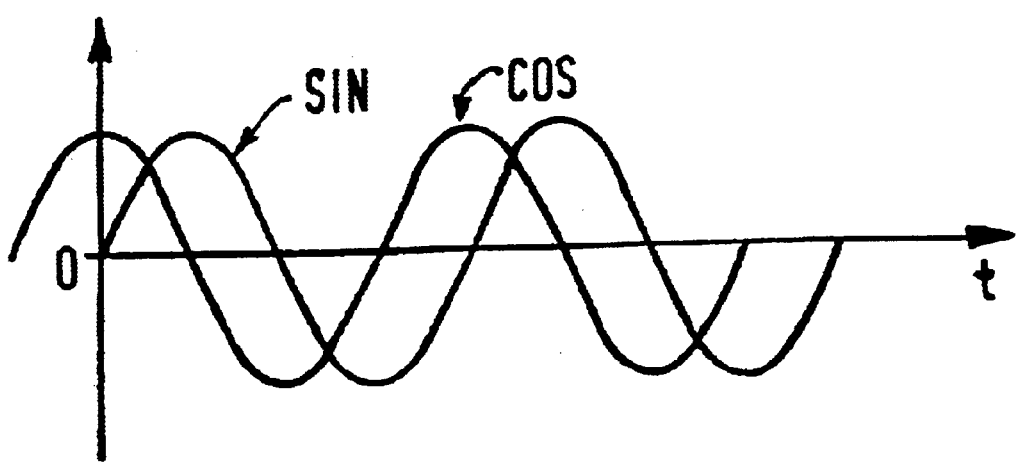
Figure 4:
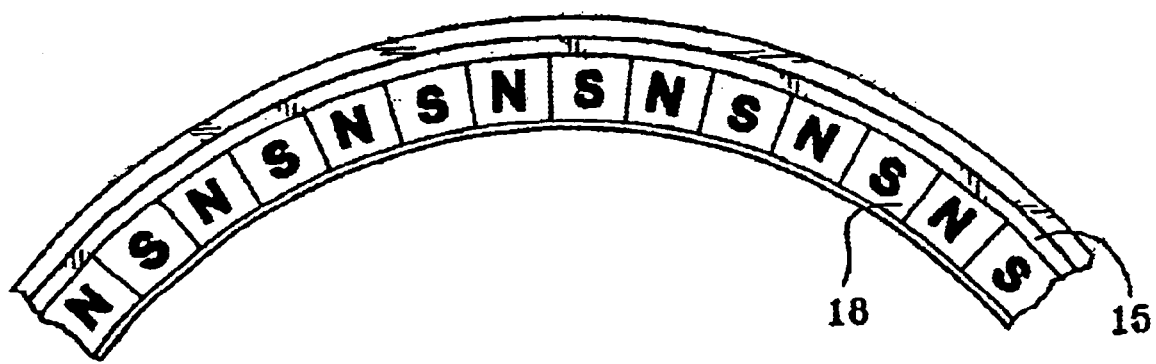
FIG. 4 is a partial front elevational view of an exemplary encoder of the present invention.

In the embodiment represented in FIGS. 2 and 3, twenty-four sensitive elements 5 are provided.

This arrangement defines a strip 6 of sensitive elements 5 of length equal to (2N−1)d.

The detection device also comprises an electronic circuit 7 making it possible to process the analog signals emanating from the various sensitive elements 5 so as to obtain information such as for example the speed, and/or the direction and/or the angle of rotation of the multipole magnetic encoder, and, thereby, the speed and/or the direction and/or the angle of rotation of the race of a bearing supporting this encoder.

The detection device can be used integrated on a silicon substrate or the like for example AsGa, so as to form an application specific customized integrated circuits, which is sometimes designated by the term ASIC (Application Specific Integrated Circuit) so as to refer to the integrated circuits designed partially or entirely on the basis of requirements.

In the embodiment of FIG. 2, the assembly of sensitive elements 5 is divided into two subassemblies 8, 9 of N elements (N=12, in the embodiment of FIG. 2).

Each sensitive element 5 of the first subassembly 8 is connected to a first adder or addition circuit 10, such as the amplifier, ensuring the summation of the signals $Se_1$, $Se_2$, ..., $Se_N$, emanating from the first N sensitive elements 5.

Likewise, each sensitive element 5 of the second subassembly 9 is connected to a second adder or addition circuit 11, such as an amplifier, ensuring the summation of the signals $Se_{(N+1)}$, $Se_{(N+2)}$, $Se_{(N+3)}$, ..., $Se_{2N}$, emanating from the other N sensitive elements.

Two sum signals are thus obtained:

$$S_1 = Se_1 + \ldots + Se_N$$

$$S_2 = Se_{(N+1)} + \ldots + Se_{2N}.$$

The two sums $S_1$ and $S_2$ from the first and second adder means are connected to the input of a third adder means or addition circuit 12.

The output $S_1$ of the first adder means and, via an inverter, the output $S_2$ of the second adder means are connected to the input of a fourth adder means or addition circuit 14.

Let:

$$Se_1 = \sin(wt - \alpha/2)$$

$$Se_2 = \ldots$$

$$Se_{(2N-1)} = \ldots$$

$$Se_{2N} = \sin(wt - (1/2 + 2N - 1)\alpha)$$

Where α corresponds to the phase shift between two sensitive elements ($\alpha = \pi/2N \cdot Lp0/Lp$) and the length $Lp0 = 2Nd$ is directly related to the length of the strip of sensitive elements.

Two sinusoidal signals:

$S_1 + S_2$ (referred to hereinafter as "SIN") and $S_1 - S_2$ (referred to hereinafter as "COS") respectively then appear at the outputs of the third 12 and fourth adder means 14 with $$SIN = (\sin(\pi Lp0/2Lp)) \cdot \sin(wt - \pi Lp0/2Lp)/\sin(\pi/2 \cdot Lp \cdot Lp0/2N)$$

$$COS = 2\sin^2(\pi Lp0/4Lp) \cdot \cos(wt - \pi Lp0/2Lp)/\sin(\pi/2 \cdot Lp \cdot Lp0/2N)$$

d being the distance between sensitive elements.

According to the two formulae above, it is apparent that, when the polar length Lp is equal to 2Nd, the detection device delivers two signals of like amplitude SIN and COS in perfect quadrature. It is therefore apparent that Lp0=2Nd is the reference length for which the amplitudes of the SIN and of the COS are identical.

The device therefore makes it possible to circumvent the tolerances in the placement of the sensitive elements, as for example when the sensitive elements are placed on a substrate.

Moreover, when the polar length Lp of the encoder is not suited to the sensor, only the amplitude of the signals is modified, the phase of these signals being kept constant.

Hence, if the device is implemented with no electronic interpolation system, that is to say if the digital signals have an identical resolution to that of the magnetic encoder, the quadrature of the signals SIN and COS is preserved, for a wide range of polar lengths Lp.

With a view to the use of an interpolator increasing the resolution of the output signals from the detection device, described for example in patent application FR-2 754 063, the analog signals must fulfill the following conditions so as to ensure interpolated digital signals of good quality:

be in perfect quadrature;

be of like amplitude;

be devoid of magnetic and electronic offset.

A second embodiment of the invention proposes a detection device which delivers analog signals fulfilling these three conditions within a wide range of polar lengths Lp.

The detection device described above delivers signals in perfect quadrature.

The ratio of the amplitudes of the analog signals SIN and COS is given by the formula:

$$R = \text{amp(COS)}/\text{amp(SIN)} = \tan(\pi Lp0/4Lp)$$

It is apparent that when the length Lp0 is greater than the polar length Lp, the amplitude of the SIN signal is less than that of the COS signal.

When Lp0 is equal to Lp, the amplitudes of the SIN and COS signals are equal.

When Lp0 is less than Lp, the amplitude of the SIN signal is greater than that of the COS signal.

In a first variant embodiment, and when Lp0 is greater than Lp, a means of increasing the number of polar lengths usable and of reducing the length of the strip to 2M elements used out of the 2N (M being less than N), by programming, for example of EEPROM or Zener Zapping type.

Here, EEPROM designates an electrically erasable reprogrammable memory, each of whose cells is for example formed of an MNOS or DIFMOS transistor or the like, with read and write transistors, the MNOS transistors (Metal Nitride Oxide Semiconductor), derived from MOS transistors, forming a semiconductor memory.

The expression Zener zapping conventionally designates Zener trimming, that is to say a correcting of any error in voltage delivered by a digitizer in respect of a specified input binary word, by selectively short-circuiting reverse-biased Zener diodes powered by constant-current sources of increasing intensity, the total intensity of the circuit thus obtained creating the necessary correction voltage across the terminals of a resistor.

A strip of thirty sensitive elements spaced 0.1 mm apart can thus be usable for polar length of between 3 and 1 mm with a spacing of 0.2 mm (values below 1 mm are in theory usable, but deliver little magnetic fields).

Consequently, the programming of the sensor renders them usable when faced by 11 different polar lengths in this case.

In a second variant embodiment, one of the two signals can be electronically amplified with respect to the other so as to recover an identical amplitude for the SIN and COS signals.

The magnetic and electric offset corresponds to a continuous component (the magnetic offset is for its part assumed to be uniform over the assembly of sensitive elements) which are added to the signals detected.

Since the COS is obtained by subtracting the signals $S_1$ and $S_2$, the continuous component related to the magnetic offset of each of the two terms is thus eliminated.

This is not true for the SIN, which for its part is obtained by summing all the signals emanating from the sensitive elements.

One solution making it possible to circumvent the magnetic offset in the SIN, and illustrated in FIG. 3, consists in splitting the strip up into four quadrants with P sensitive elements, the strip being composed of 4 P sensitive elements, and using an electronic circuit, for example based on adder amplifiers and on inverters, to form the following combinations:

$$SIN=S_1-S_2-(S'_1-S'_2);$$

$$COS=S_1+S_2-(S'_1+S'_2)$$

In the example illustrated in FIG. 3, the strip composed of 4P sensitive elements covers a complete magnetic period, that is to say:

Lp0=2Lp with Lp0=2Pd

Given the fact that the SIN signal is henceforth obtained by differencing two differences, the continuous component related to the magnetic offset is thus eliminated.

The analog signals used in the interpolator are therefore devoid of magnetic offsets. The electronic component can be reduced, moreover, by other means which are not described in the present patent application.

When the strip is made up of 4P sensitive elements covering a complete magnetic period, the splitting of the strip into four quadrants, such as represented in FIG. 3, leads to SIN and COS signals with the following expresssions:

$$SIN = \frac{-4\sin(\pi/8 \cdot Lp0/Lp)\sin(\pi 4 \cdot Lp0/Lp)}{SIN(\pi/2Lp.Lp0/4N)} \sin\left(wt-\pi Lp0/Lp\right)$$

$$COS = \frac{2\sin^2(\pi/4 \cdot Lp0/Lp)}{\sin(\pi/2/Lp \cdot Lp0/4N} \cdot \cos(wt-\pi Lp0/Lp)$$

The canceling of the magnetic offset, by virtue of this splitting into four quadrants, is compatible with the amplifying of the SIN or COS signal so as to increase the allowable polar lengths, when the polar length Lp is less than the length Lp0.

The value of the gain is then given by the following formula:

$$R=amp(COS)/amp(SIN)=\sin(\pi Lp0/4Lp)2\ \sin(\pi Lp0/8Lp).$$

The device according to the invention makes it possible to measure the magnetic field delivered by a multipole magnetic encoder and to deliver two analog signals which are always 90° out of phase electrically, and to do so independently of the polar length of the sensor.

The processing of these two analog signals by an ad-hoc circuit, not represented, makes it possible to deduce the direction of rotation of the multipole magnetic encoder, even for a low rotation speed.

What is claimed is:

1. A bearing provided with an annular means generating magnetic pulses and with a device for detecting these pulses, wherein the detection device comprises an even number 2N of aligned sensitive elements configured for continuous detection of the pulses, wherein the assembly of 2N sensitive elements is divided into two subassemblies of N elements, each sensitive element of the first subassembly being connected to a first adder, each sensitive element of the second subassembly being connected to a second adder, the two sums ($S_1$, $S_2$) emanating from the first and second adders being connected to the input of a third adder, the output ($S_1$) of the first adder and, via an inverter, the output ($S_2$) of the second adder being connected to the input of a fourth adder, the signals SIN=$S_1$+$S_2$ and COS=$S_1$−$S_2$ emanating from the third and fourth adders being processed by a circuit so as to deduce the direction of rotation and/or the speed of rotation and/or the position of the pulse generating means with respect to the detection device.

2. The bearing as claimed in claim 1, wherein the sensitive elements are chosen from among the groups comprising Hall-effect probes, magnetoresistors, giant magnetoresistors.

3. The bearing as claimed in claim 1, wherein the sensitive elements are placed equidistantly from one another.

4. The bearing as claimed in claim 1, wherein the pulse generating means is an annular member which is made of a synthetic material laden with ferrite particles and is formed by a plurality of contiguous domains having reversed direction of magnetization of a given domain with respect to the two domains which are contiguous with it.

5. The bearing as claimed in claim 1, wherein the polar length (Lp) of the encoder is substantially equal to the product of the number (2N) of sensitive elements times the distance (d) between sensitive elements, the signals SIN and COS then being in substantially perfect quadrature and of substantially like amplitude.

6. The bearing as claimed in claim 1, wherein the polar length (Lp) of the encoder is less than the product of the number (2N) of sensitive elements times the distance (d) between sensitive elements.

7. The bearing as claimed in claim 1, wherein the polar length (Lp) of the encoder is greater than the product of the number (2N) of sensitive elements times the distance (d) between sensitive elements.

8. The bearing as claimed in claim 7, wherein, by programming, an even number (2M) of sensitive elements, less than the total number (2N) of these elements is employed to form two subassemblies of M elements, each sensitive element of the first subassembly being connected to a first adder, each sensitive element of the second subassembly being connected to a second adder, the two sums emanating from the first and second adders being connected to the input of a third adder, the output of the first adder and, via an inverter, the output of the second adder being connected to the input of a fourth adder, the signals emanating from the third and fourth adders being processed by a circuit so as to deduce the direction of rotation and/or the speed or rotation and/or the position of the pulse generating means with respect to the detection device, said signals being in substantially perfect quadrature.

9. The bearing as claimed in claim 8, wherein the programming is carried out by EEPROM.

10. The bearing as claimed in claim 8, wherein the programming is carried out by Zener Zapping.

11. The bearing as claimed in claim 6, wherein an amplifier circuit is able to re-establish an identical amplitude for the signals emanating from the third and fourth adders.

12. The bearing as claimed in claim 1, wherein the detection device comprises a number of sensitive elements which is a multiple of four.

13. The bearing as claimed in claim 12, wherein the assembly of 4P sensitive elements is divided into four subassemblies of P elements, each sensitive element of the first subassembly with P elements being connected to a first adder supplying a signal $S_1$;

each sensitive element of the second subassembly with P elements being connected to a second adder supplying a signal $S_2$;

each sensitive element of the third subassembly with P elements being connected to a third adder supplying a signal $S'_1$;

each sensitive element of the fourth subassembly with P elements being connected to a fourth adder supplying a signal $S'_2$;

a circuit of adders and of inverters supplying two signals SIN and COS respectively equal to:

$$SIN=(S_1-S_2)-(S'_1-S'_2);$$

$$COS=(S_1+S_2)-(S'_1+S'_2);$$

these signals SIN and COS being devoid of magnetic offset.

14. The bearing as claimed in claim 13, wherein the detection device comprises an interpolator increasing the resolution of these output signals.

15. The bearing as claimed in claim 1, wherein the sensitive elements are integrated on an ASIC type circuit support.

16. The bearing as claimed in claim 15, wherein the detection device is incorporated within an ASIC type customized integrated circuit.

17. The bearing as claimed in claim 1, wherein the pulse generating means is integrated into a preassembled assembly forming a seal.

18. The bearing as claimed in claim 17, wherein the detection device is secured in a possibly removable manner to the fixed race.

19. A device for processing signals from a detection device configured for detecting magnetic pulses from an annular means generating magnetic pulses, wherein the detection device comprises an even number 2N of aligned sensitive elements, wherein the assembly of 2N sensitive elements is divided into two subassemblies of N elements, each sensitive element of the first subassembly being connected to a first adder, each sensitive element of the second subassembly being connected to a second adder, the two sums ($S_1$, $S_2$) emanating from the first and second adders being connected to the input of a third adder, the output ($S_1$) of the first adder and, via an inverter, the output ($S_2$) of the second adder being connected to the input of a fourth adder, the signals SIN=$S_1+S_2$ and COS=$S_1-S_2$ emanating from the third and fourth adders being processed by a circuit so as to deduce the direction of rotation and/or the speed of rotation and/or the position of the pulse generating means with respect to the detection device.

20. The device for processing signals as claimed in claim 19, wherein the detection device comprises 4P sensitive elements and wherein the assembly of 4P sensitive elements is divided into four subassemblies of P elements, each sensitive element of the first subassembly with P elements being connected to a first adder supplying a signal $S_1$;

each sensitive element of the second subassembly with P elements being connected to a second adder supplying a signal $S_2$;

each sensitive element of a third subassembly with P elements being connected to a third adder supplying a signal $S'_1$;

each sensitive element of the fourth subassembly with P elements being connected to a fourth adder supplying a signal $S'_2$;

a circuit of adders and of inverters supplying two signals SIN and COS respectively equal to:

$$SIN=(S_1-S_2)-(S'_1-S'_2);$$

$$COS=(S_1+S_2)-(S'_1+S'_2);$$

these signals SIN and COS being devoid of magnetic offset.

* * * * *